United States Patent [19]
Eberle et al.

[11] 3,757,067
[45] Sept. 4, 1973

[54] SWITCH DEVICE FOR INDICATING THE PRESENCE OF A LOAD ON THE SEAT OF AN AUTOMOTIVE VEHICLE

[75] Inventors: Dieter Eberle, Tamm/Wurttemberg; Dieter Hanselmann, Bietigheim, both of Germany

[73] Assignee: SWF-Spezialfabrik Fur Autozubehor Gustav Rau GmbH, Bietigheim, Germany

[22] Filed: Apr. 13, 1972

[21] Appl. No.: 243,673

[30] Foreign Application Priority Data
Apr. 20, 1971   Germany................. G 71 14 940.1

[52] U.S. Cl. ............................. 200/85 A, 340/278
[51] Int. Cl. ............................................. H01h 3/14
[58] Field of Search........................... 200/85, 85 A; 340/278

[56] References Cited
FOREIGN PATENTS OR APPLICATIONS
1,386,384   12/1964   France............................... 340/278
1,048,784   1/1959   Germany........................... 200/85 R

*Primary Examiner*—David Smith, Jr.
*Attorney*—John J. McGlew et al.

[57] ABSTRACT

The switch device is useful with a resilient automotive seat having a supporting frame and including a spring suspension supporting upholstery covered by a seat cover. A band spring extends transversely of the seating surface of the seat, in the form of an upwardly extending arch. A support is mounted on the band spring at the top of the arch, and carries a pressure switch having an actuating member. A pressure plate on the actuating member engages the underside of the spring suspension or the seating surface. A bearing bush is secured to the band spring and receives a bearing connected to the pressure switch so that the pressure plate, secured to the switch actuator, can adapt itself to inclinations of the seating surface without the actuating member of the pressure switch being unequally loaded.

4 Claims, 2 Drawing Figures

3,757,067

SWITCH DEVICE FOR INDICATING THE PRESENCE OF A LOAD ON THE SEAT OF AN AUTOMOTIVE VEHICLE

BACKGROUND OF THE INVENTION

In order to increase the safety of passengers in an automotive vehicle, it has been considered advisable to provide, to the driver, a signal when a passenger has occupied a seat but has not fastened the seat belt. In order to produce such a signal, it is necessary to provide a switch device which is actuated when a vehicle seat is loaded.

The vehicle seat generally is constructed as a rigid member on a seat frame to which the seat is secured as a unit, with the assembly being secured to the floor of the vehicle. A spring suspension, including upholstery and a seat cover, is mounted on the seat frame.

SUMMARY OF THE INVENTION

This invention is directed to a switch device for indicating the presence of a load on the seat of an automotive vehicle.

The objective of the present invention is to provide such a seat device which is actuated when the seat is loaded and even if the loading is unevenly distributed. The switch device is of simple design and may be added to already existing vehicle seats.

In accordance with the invention, the switching device includes a spring-mounted support secured to the seat frame and carrying a pressure switch whose actuating member carries a pressure plate which rests against the underside of the resilient seat.

The resilient seat sags when the seat is loaded, and this actuates the resiliently-suspended pressure switch through the pressure plate. The pressure switch itself may have either make contacts, break contacts, or changeover contacts, depending on the monitory circuit. The change in the distance between the underside of the seat and the rigid seat frame is converted into a switching movement for actuating the pressure switch.

A resilient support for the pressure switch is absolutely essential, since the sagging of the seating surface varies greatly in dependence on the load and the distribution of the load over the seating surface. In addition, comparatively large manufacturing tolerances, as well as deflection variations due to the aging of the seat, have to be taken into consideration. The considerable sagging movements and sagging tolerances cannot be absorbed directly by the pressure switch without impairing the spring mounting of the seat. Consequently, the resilient support for the pressure switch adapts the sagging of the seat to the switching movement of the pressure switch. In addition, this also assures that the switching position of the pressure switch does not change during alterations of the load on the seating surface. The support preferably is designed as a band spring which is suspended or otherwise secured to two opposite sides of the seat frame.

In accordance with a further feature of the invention switch device, actuation of the pressure switch is induced even when the seating surface sags only slightly, if the band spring is directed transversely of the seating surface and the pressure plate is supported in the center of the seating surface against the spring suspension provided on the underside of the seating surface. The band spring is curved upwardly from the seat frame to the underside of the seat, and carries the pressure switch on its surface facing the seat.

In order to assure reliable actuation of the pressure switch with unequal loading of the seating surface, preferably the pressure switch is connected to a bearing which is journalled to rotate in a bearing bush connected to the band spring. The bearing and the bearing bush preferably extend transversely of the seating surface. With this arrangement, the pressure plate rests against the underside of the seat, and is able to adapt itself to inclination of the seating surface without the actuating member of the pressure switch being unequally loaded thereby. Since the pressure switch necessarily is adjustable, this assures that the actuating member of the switch is always loaded only in the actuating direction. The articulated connection between the resilient support and the pressure switch is obtained by securing the pressure switch to a base plate having an offset forming a recess for the bearing.

An object of the invention is to provide an improved switch device for indicating the presence of a load on the seat of an automotive vehicle.

Another object of the invention is to provide such a switch device which is actuated when the seat is loaded even if the loading is unevenly distributed.

A further object of the invention is to provide such a switch device which is of simple design.

Another object of the invention is to provide such a switch device which may be added to already-existing automotive vehicle seats.

For an understanding of the principles of the invention, reference is made to the following description of a typical embodiment thereof as illustrated in the accompanying drawing.

BRIEF DESCRIPTION OF THE DRAWING of the

In the Drawing:

FIG. 1 is a side elevation view illustrating a switch device embodying the invention as mounted in operative relation with an automotive vehicle seat; and FIG. 2 is a partial plan view illustrating the connection of the pressure switch to the spring mounted support.

DESCRIPTION OF THE PREFERRED EMBODIMENT

Figure 1:
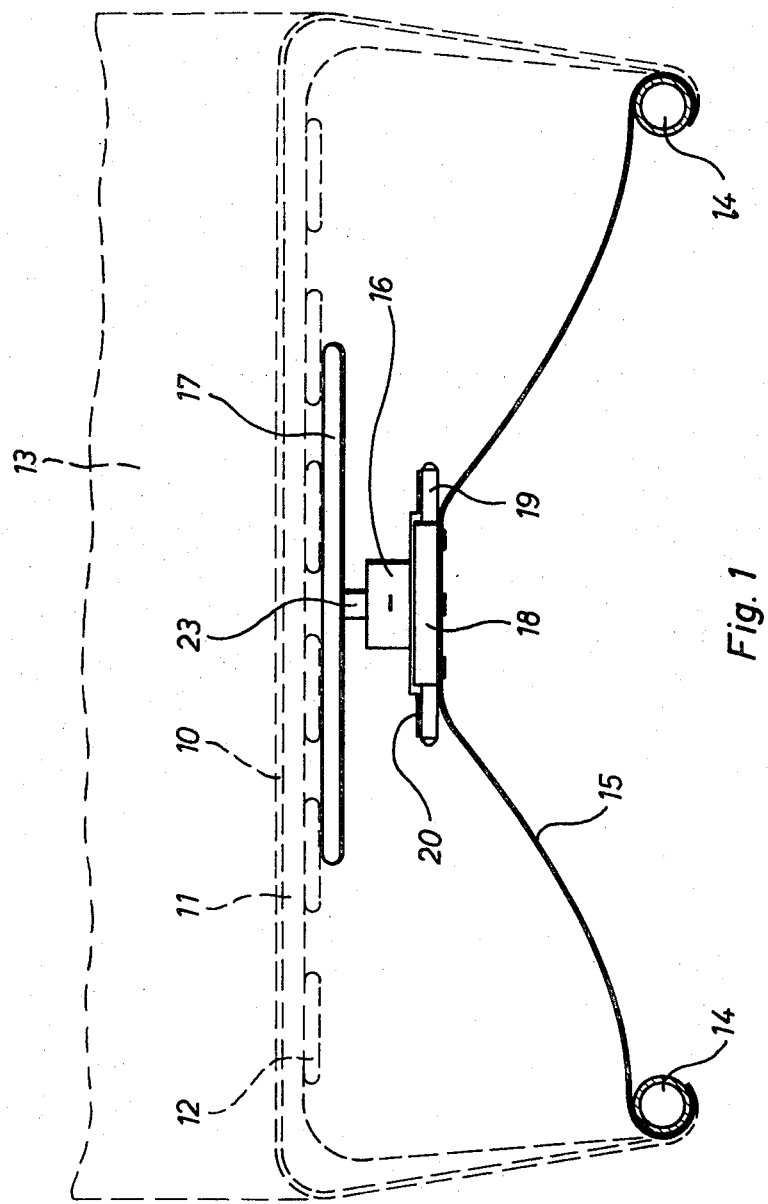

Referring first to FIG. 1, the seating surface of an automotive vehicle seat comprises a spring suspension 12, upholstery 11 and a seat cover 10. Spring suspension 12 is connected to a rigid seat frame 14 which is formed of bent tubing. The seat back 13 adjoins the back edge of the seating surface. A band spring 15 engages two side members of seat frame 14 and stretches transversely across the seating surface. Spring 14 is arched upwardly toward the underside of the seat, that is, towards spring suspension 12.

Figure 2:
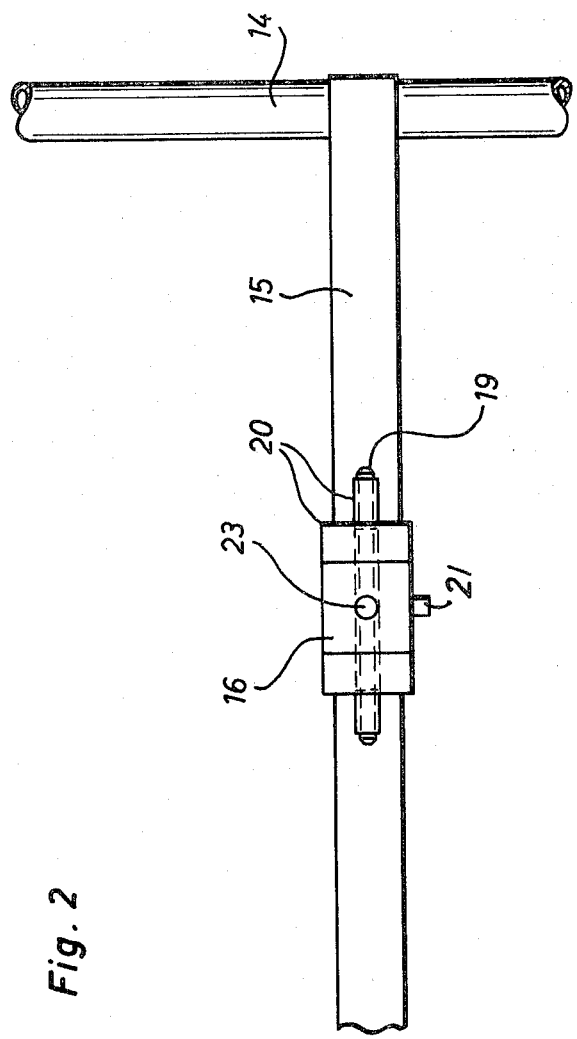

Band spring 15 is connected to a bearing bush 18 on the raised center part of the band spring facing the seat, and a bearing 19 is journalled to rotate in bush 18. As shown in FIG. 2, bearing 19 is connected, by means of bent portions of the base plate 20, to a pressure switch 16 having an actuating member 23. Actuating member 23 carries a large pressure plate 17 engaged with the spring suspension 12.

Pressure plate 17 is located at the central area of the seat, so that this part of the seat, which sags the most, is utilized for actuating pressure switch 16. When the seat sags, pressure switch 16 is immediately actuated. Band spring 15 yieldingly supports pressure switch 16, which thus retains its actuating switching position even with considerable sagging and over a large sagging range. Pressure switch 16 is not overloaded since band spring 15 yields accordingly.

When the seating surface is unevenly loaded, its tilt or incline may change. Pressure plate 17 is able to adapt itself to this tilt or incline as a result of the pivotal mounting of switch 16 through bearing 19 and bearing bush 18. Pressure switch 16 is so actuated that actuating member 23 is always urged only in the direction of actuation.

When band spring 15 extends transversely of the seating surface, the bearing formed by bearing bush 18 and bearing 19 also extends transversely of the seating surface. In this manner, the considerable changes of position of the seating surface occurring in the direction of the seat are compensated. The pressure switch is always reliably actuated even with unequal loading of the seating surface, and retains its actuated position even under varying loads.

The bent portions of base plate 20 may be secured to bearing 19 in any suitable manner, such as by welding, bracing, or the like. Also, switch 16 may be provided with suitable terminals, such as indicated at 21, for connection in a monitoring circuit.

While a specific embodiment of the invention has been shown and described in detail to illustrate the principles of the invention, it will be understood that the invention may be embodied otherwise without departing from such principles.

What is claimed is:

1. A switch device, for indicating the presence of a load on the seating surface of a resilient automotive vehicle seat having a supporting frame, said switch device comprising, in combination, a spring-mounted support secured to said frame; a pressure switch having a rectilinearly movable member; a pressure plate on said actuating member engaging the underside of said seating surface; and articulated means mounting said switch on said support for pivotal movement about said support whereby said pressure plate can conform to uneven loading of said seating surface while assuring rectilinear movement of said actuating member thereby.

2. A switch device, for indicating the presence of a load on the seating surface of a resilient automotive vehicle seat having a supporting frame, said switch device comprising, in combination, a spring-mounted support secured to said frame; a pressure switch mounted on said support and having an actuating member; a pressure plate on said actuating member engaging the underside of said seating surface; said support being mounted on a band spring having its opposite ends engaged on respective opposite sides of said supporting frame; a bearing connected to said pressure switch; and a bearing bush connected to said band spring; said bearing being journalled in said bearing bush.

3. A switch device, as claimed in claim 2, wherein said bearing and said bearing bush extend transversely of the seating surface.

4. A switch device, as claimed in claim 2, including a base plate having bent portions forming a recess for said bearing; said pressure switch being secured to said base plate.

* * * * *